United States Patent [19]
Chiang

[11] Patent Number: 5,992,306
[45] Date of Patent: Nov. 30, 1999

[54] STRUCTURE OF A HAND HOLDING NET BASKET FOR FRYING

[75] Inventor: Tai Kun Chiang, Taipei Hsien, Taiwan

[73] Assignee: Century Machinery Corp., Taipei Hsien, Taiwan

[21] Appl. No.: 09/173,023

[22] Filed: Oct. 15, 1998

[51] Int. Cl.[6] .............................. A47J 37/00; A47J 37/12
[52] U.S. Cl. ................. 99/411; 99/403; 99/413; 99/426; 99/450; 210/464; 210/470; 211/181.1
[58] Field of Search ..................... 99/336, 403, 410–418, 99/409, 407, 426, 450; 16/120, 110 R, 110.5, 110 A; 210/464, 470, 469, 474, 475, 477, DIG. 8, 167; 211/181.1; 220/751, 912; D7/354, 409

[56] References Cited

U.S. PATENT DOCUMENTS

| | | | |
|---|---|---|---|
| 1,721,161 | 5/1929 | Olson | 99/411 |
| 2,593,392 | 4/1952 | Budlane et al. | 99/413 |
| 2,772,626 | 12/1956 | Shaw | 99/336 |
| 3,071,064 | 1/1963 | Horvath | 210/DIG. 8 |
| 3,217,633 | 11/1965 | Anetsberger | 99/410 X |
| 3,242,849 | 3/1966 | Wells | 99/411 |
| 3,331,309 | 7/1967 | Proffitt | 99/403 X |
| 3,525,299 | 8/1970 | Gouwerts | 99/410 X |
| 4,626,352 | 12/1986 | Massey et al. | 210/469 |
| 4,854,227 | 8/1989 | Koopman | 211/181.1 X |
| 5,253,566 | 10/1993 | McCabe et al. | 99/403 |
| 5,385,084 | 1/1995 | Laibson | 99/411 |
| 5,544,567 | 8/1996 | Davis et al. | 99/336 |

*Primary Examiner*—Timothy F. Simone
*Attorney, Agent, or Firm*—Rosenberg, Klein & Bilker

[57] ABSTRACT

An improved structure of a hand holding net basket for frying comprises a rectangular upper basket frame and a rectangular lower basket frame for being connected with a net frame. Two concave cambered surfaces are installed on the two front sides of the lower basket frame so that after the lower end of the hook has been arranged within the two cambered surfaces, it may be welded in various points. Also, the inner rim of the lower basket frame is connected with a handle, and a bracket like a water droplet is extended downwards from the handle. The cambered portion on the front end of the bracket is welded between the concave cambered surfaces of the lower basket frame. Thus three symmetric points are formed on the front end of the concave cambered surface and the bracket for increasing the stability of the structure. Thus, the net-covered basket may be prevented to become loose so to cause a danger accident due to continuously flap or beat and the lifetime of the basket is prolonged.

1 Claim, 3 Drawing Sheets

STRUCTURE OF A HAND HOLDING NET BASKET FOR FRYING

BACKGROUND OF THE INVENTION

1. Field of the Invention

The present invention is related to an improved structure of a hand holding net basket for frying, especially, to a net basket which is tightly fixed by symmetric fulcrums so to increased the tightness thereof, and scraps will not accumulate in the gaps within the structure.

2. Description of the Prior Art

In general, the fried chicken, potato strips, etc. is put within a hand holding net basket, and then the basket within food therein is put into oil for frying. While in a prior art net basket is shown in FIG. 1, an upper basket frame (1) and a lower basket frame (2) are installed for being connected with a net frame (3). A hook (11) is installed on the front rim of the upper basket frame (1), while a handle (21) is connected on the inner rim of the lower basket frame (2). A triangle bracket (22) extended downwards from the handle (22) to the lower end of the net frame (3). Then the two front sides of the bracket (22) are welded on the front portion of the lower basket frame (2). In this structure, since the lower end of the hook (11) resists against the front rim of the lower basket frame (2), and because of no welding therebetween, thus scraps are easy existed in the gaps (such as potato scraps). If these scraps do not be removed, then they will be fried continuously. Thus, the order of the food can be affected and it is possible to harm the eater's health. The fulcrums of the whole net basket are only exhibited in the two sides of the bracket (22) and the welding portion of the lower basket frame (2). Therefore, the stability is worse. Generally, in order to remove the scraps between the lower end of the hook and the lower basket frame, it is necessary to beat and flap the net basket continuously. Thus, the hook (11) and the bracket (22) will become loose. Therefore, this is not an ideal design.

SUMMARY OF THE INVENTION

Accordingly, the object of the present invention is to provide an improved structure of a hand holding net basket for frying comprises a rectangular upper basket frame and a rectangular lower basket frame for being connected with a net frame. Two concave cambered surfaces are installed on the two front sides of the lower basket frame so that after the lower end of a hook has been arranged within the two cambered surfaces, it may be welded in various points. Also, the inner rim of the lower basket frame is connected with a handle, and a bracket like a water droplet is extended downwards from the handle. The cambered portion on the front end of the bracket is welded between the concave cambered surfaces of the lower basket frame. Thus three symmetric points are formed on the front end of the concave cambered surface and the bracket for increasing the stability of the structure. Thus, the net-covered basket may be prevented to become loose and cause a danger due to continuously flap or beat and the lifetime of the basket is prolonged.

BRIEF DESCRIPTION OF THE DRAWINGS

The present invention will be better understood and its numerous objects and advantages will become apparent to those skilled in the art by referencing to the following drawings in which.

DESCRIPTION OF THE PREFERRED EMBODIMENT

Figure 1:
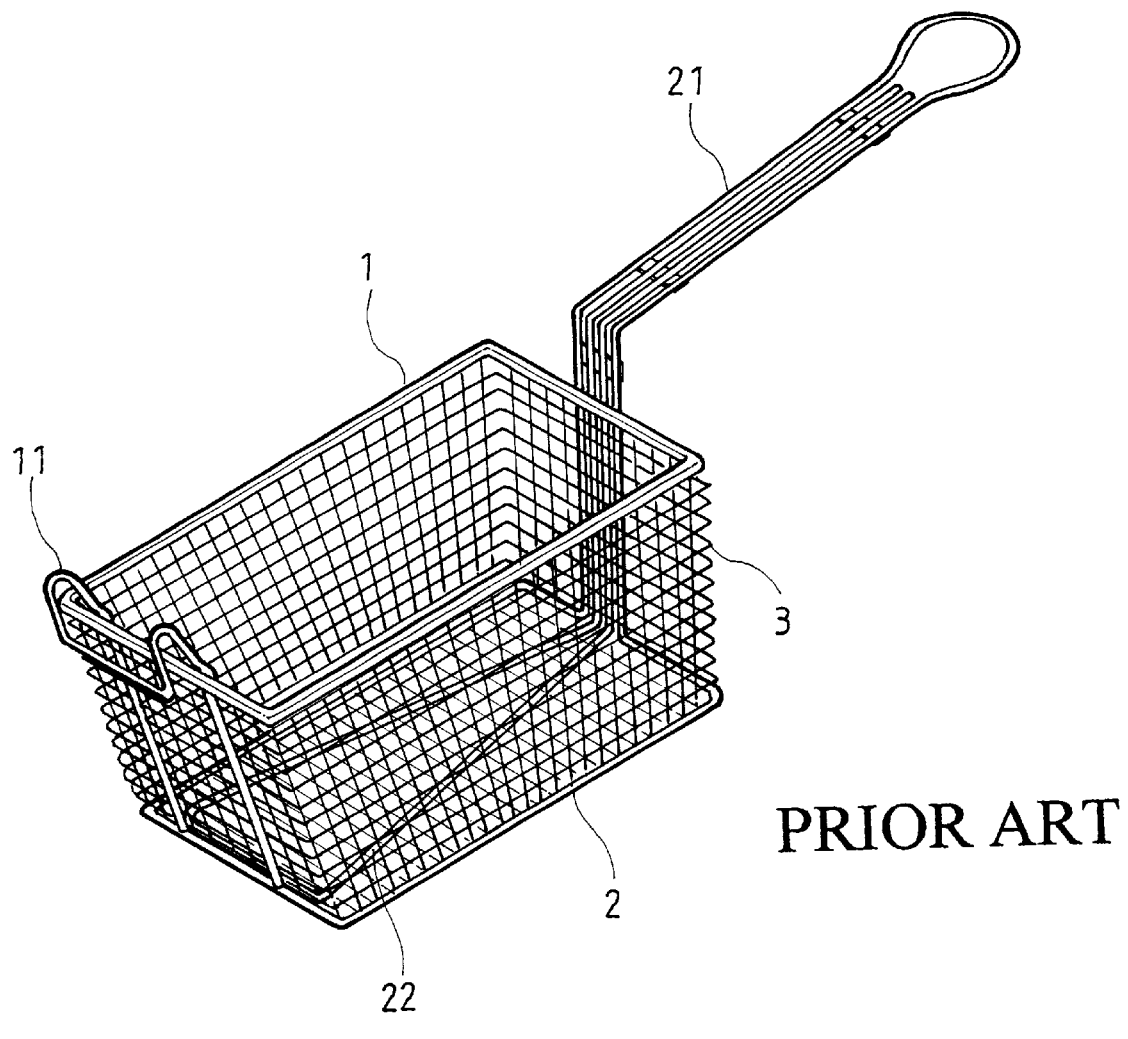
FIG. 1 shows the perspective view of a prior art net basket.
Figure 2:
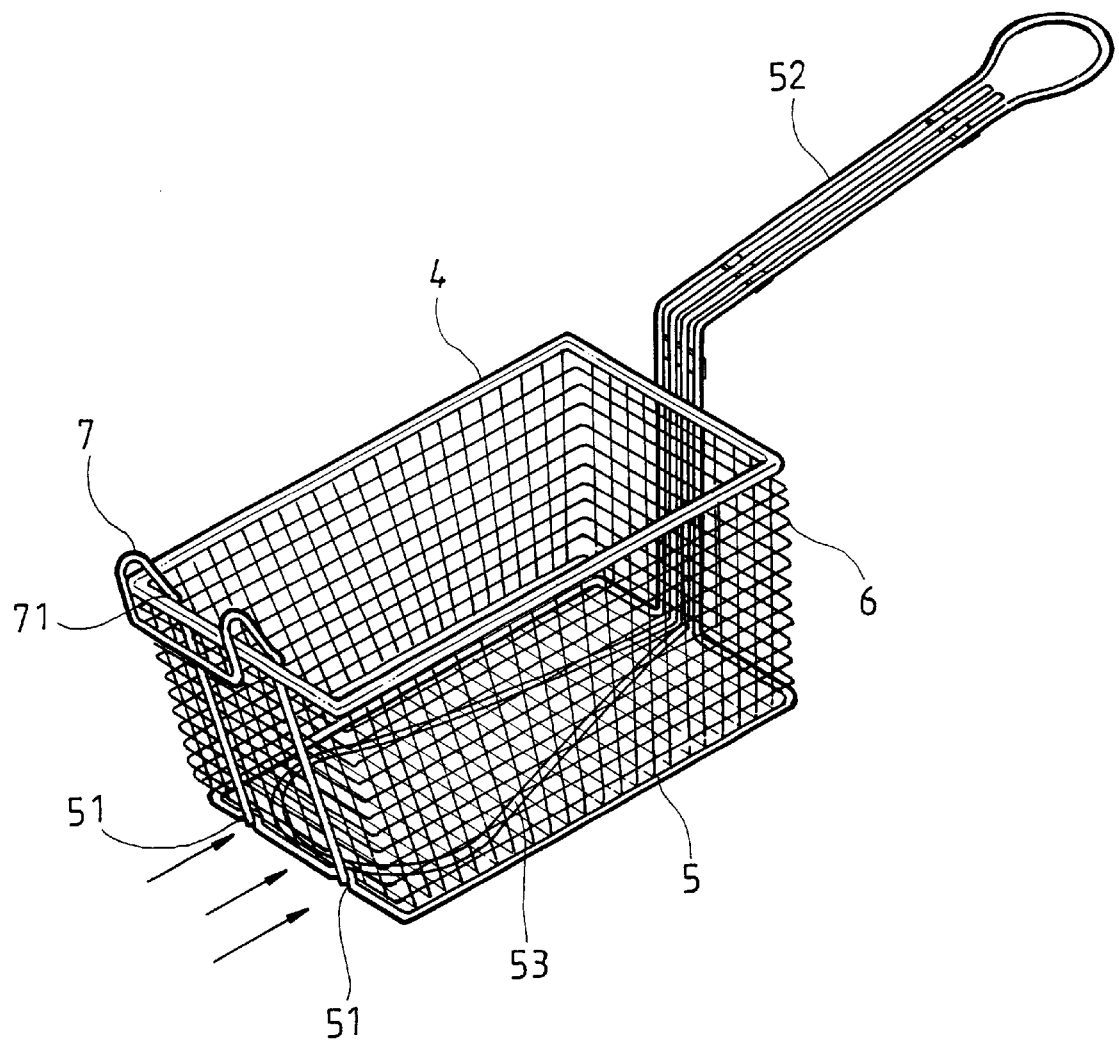
FIG. 2 is a perspective view of the present invention.
Figure 3A:
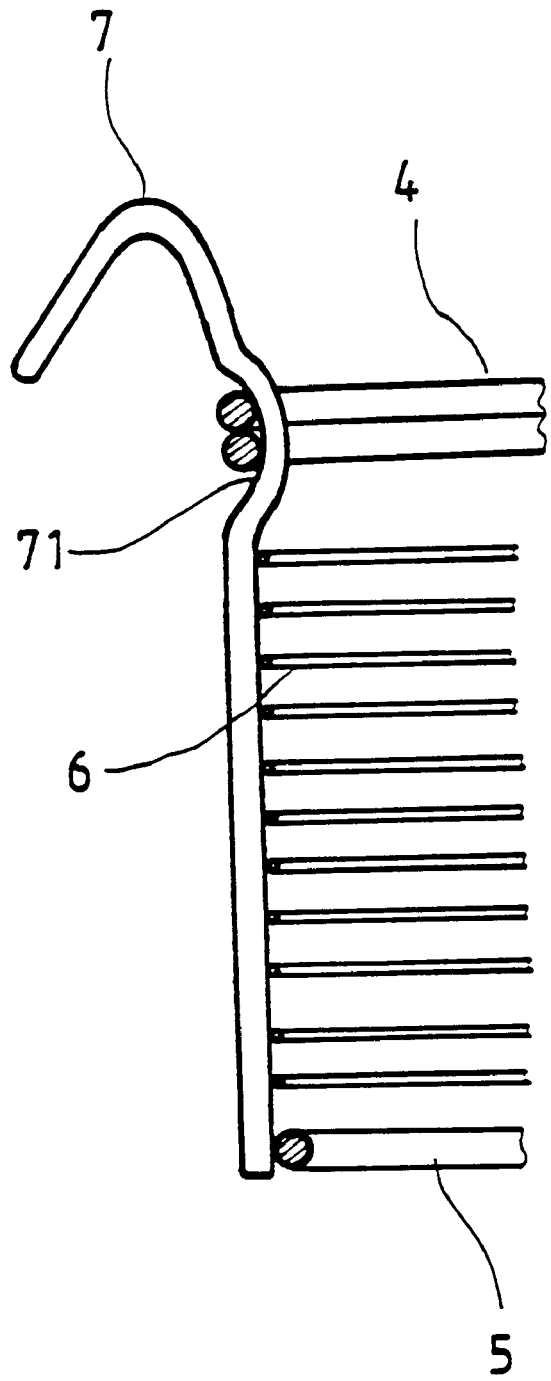
FIG. 3A is a partially cut away elevational view of the net basket showing the cambered portion of the front end of the net basket.

Referring now to FIG. 2, the hand holding net basket of the present invention are installed with a rectangular upper basket frame (4) and a rectangular lower basket frame (5). The front end of the basket frame (4) and (5) are installed with a U shape hook (7). A concave cambered surface (71), as seen in FIG. 3A, is formed on the vertical portion of the hook (7) so that the cambered surface (71) is welded on the front edge of the upper basket frame (4). Two concave cambered surfaces (51) are installed on the two front sides of the lower basket frame (5) so that after the lower end of the hook (7) has been arranged within the two cambered surfaces (51), it may be welded in various points. Thus, the hook (7) and the two concave cambered surfaces (51) may be welded completely (no gaps) and any scraps will not occurred. Also, the basket frames (4) and (5) are formed with fixing points and become more stable.

An handle (52) is installed on the inner rim of the lower basket frame (5) and a bracket (53) like a water droplet is extended downwards from the handle (52). The cambered portion on the front end of the bracket (53) is welded between the concave cambered surfaces (51) of the lower basket frame (4). Thus three symmetric points are formed on the front end of the concave cambered surface (51) and the bracket (53) for increasing the stability of the structure. Thus, the netcovered basket may be prevented to become loose due to continuously flap or beat and the lifetime of the basket is prolonged.

As shown in FIG. 3, in using the present invention, the handle (52) is held by hand so that the food to be fried is put into the net frame (6) for being put into the cooking pot. Since the lower end of the hook (7) resists against the upper end of the concave cambered surface (51) of lower basket frame (5), i.e. the concave cambered surface (71) is welded with the upper basket frame. Thus, they form a complete structure which matches with the bracket (53) so to form another fulcrum point with the lower basket frame (5). Thus, the whole net basket will become more fastened, the lifetime thereof is increased, and it can prevent that scraps are accumulated in the gaps.

Those skilled in the art will readily recognize various modifications and changes which may be made to the present invention without strictly following the exemplary embodiment and application illustrated and described herein, and without departing from the true spirit and scope of the present invention which is set forth in the following claims.

What is claimed is:

1. An improved structure of a hand holding net basket for frying comprising a rectangular upper basket frame and a rectangular lower basket frame for being connected with a net frame, a U shape hook installed on the front end of the basket frames, a concave cambered surface formed on a vertical portion of the hook so that the cambered surface is welded on a front edge of the upper basket frame, a handle being installed on an inner rim of the lower basket frame and a bracket like a water droplet extended downwards from the handle, characterized in that:

two concave cambered surfaces are installed on two front sides of the lower basket frame, respectively, so that after lower end, of the hook have been arranged within the two cambered surfaces, it may be welded in various points; the bracket installed on a lower rim of the net frame has a droplet shape, and a cambered portion on the front end of the bracket is welded between the concave cambered surfaces of the lower basket frame, thus three symmetric points are formed on the front end of the concave cambered surface and the bracket for increasing the stability of the structure.

* * * * *

UNITED STATES PATENT AND TRADEMARK OFFICE
CERTIFICATE OF CORRECTION

PATENT NO.   : 5,992,306
DATED        : NOV. 30, 1999
INVENTOR(S)  : TAI-KUEN JIANG

It is certified that error appears in the above-identified patent and that said Letters Patent is hereby corrected as shown below:

On the title page, item
[75]; DELETE THE NAME "TAI KUN CHIANG" AND INSERT

--TAI-KUEN JIANG--

Signed and Sealed this

Fourth Day of July, 2000

Attest:

Q. TODD DICKINSON

Attesting Officer

Director of Patents and Trademarks